United States Patent
Pupat (10) Patent No.: US 11,459,514 B2
(45) Date of Patent: Oct. 4, 2022

(54) HYDROCRACKING PROCESS AND DEVICE WITH REDUCTION OF POLYNUCLEAR AROMATIC COMPOUNDS

(71) Applicant: AXENS, Rueil Malmaison (FR)

(72) Inventor: Nicolas Pupat, Houilles (FR)

(73) Assignee: AXENS, Rueil Malmaison (FR)

( * ) Notice: Subject to any disclaimer, the term of this patent is extended or adjusted under 35 U.S.C. 154(b) by 243 days.

(21) Appl. No.: 15/850,658

(22) Filed: Dec. 21, 2017

(65) Prior Publication Data

US 2018/0187101 A1    Jul. 5, 2018

(30) Foreign Application Priority Data

Dec. 22, 2016    (FR) ...................... 1663096

(51) Int. Cl.
   *C10G 47/00*   (2006.01)
   *C10G 55/08*   (2006.01)
   (Continued)

(52) U.S. Cl.
   CPC ............... *C10G 55/08* (2013.01); *B01D 3/06* (2013.01); *B01D 3/143* (2013.01); *B01D 3/343* (2013.01); *B01D 3/38* (2013.01); *C10G 7/06* (2013.01); *C10G 47/00* (2013.01); *C10G 47/24* (2013.01); *C10G 49/22* (2013.01); *C10G 2300/1096* (2013.01); *C10G 2300/202* (2013.01); *C10G 2400/02* (2013.01); *C10G 2400/06* (2013.01);
   (Continued)

(58) Field of Classification Search
   CPC .......... C10G 55/08; C10G 7/06; C10G 47/00; C10G 47/24; C10G 49/22; C10G 2300/202; C10G 2300/1096; C10G 2400/06; C10G 2400/02; C10G 2400/16; C10G 2400/30; B01D 3/143; B01D 3/06; B01D 3/38; B01D 3/343
   See application file for complete search history.

(56) References Cited

U.S. PATENT DOCUMENTS

| 5,120,427 A | 6/1992 | Stine |
| 6,361,683 B1 * | 3/2002 | Kalnes .................. C10G 65/12 208/58 |

(Continued)

FOREIGN PATENT DOCUMENTS

FR    3030566 A1    6/2016

OTHER PUBLICATIONS

French 1663096 Search Report dated Aug. 10, 2017.

*Primary Examiner* — Prem G Singh
*Assistant Examiner* — Brandi M Doyle
(74) *Attorney, Agent, or Firm* — Millen, White, Zelano and Branigan, P.C.; Harry B. Shubin (57) ABSTRACT

In the hydrocracking process in accordance with the invention, which comprises a hydrocracking section, a high pressure hot separator and a fractionation section, upstream of the fractionation section, a stripper or reboiler column type separation column is added which treats at least a portion of the heavy effluent obtained from the high pressure hot separator. All or a portion of the bottom fraction from said column, which is rich in polynuclear aromatic compounds, is purged. At least a portion of the bottom fraction obtained from the fractionation section, which is constituted by unconverted products, is recycled to the reaction section.

7 Claims, 5 Drawing Sheets

(51) Int. Cl.
  *B01D 3/06*   (2006.01)
  *B01D 3/38*   (2006.01)
  *B01D 3/34*   (2006.01)
  *C10G 49/22*  (2006.01)
  *B01D 3/14*   (2006.01)
  *C10G 7/06*   (2006.01)
  *C10G 47/24*  (2006.01)

(52) U.S. Cl.
  CPC ..... *C10G 2400/16* (2013.01); *C10G 2400/30* (2013.01)

(56) References Cited

U.S. PATENT DOCUMENTS

| | | | |
|---|---|---|---|
| 2012/0145513 A1* | 6/2012 | Hoehn | C10G 7/00 |
| | | | 196/46 |
| 2012/0145594 A1 | 6/2012 | Hoehn | |
| 2013/0045138 A1* | 2/2013 | Hoehn | C10G 7/00 |
| | | | 422/187 |
| 2016/0369183 A1* | 12/2016 | Hoehn | C10G 65/10 |
| 2017/0349840 A1 | 12/2017 | Sauge | |
| 2020/0172818 A1* | 6/2020 | Hunter | B01D 3/38 |

* cited by examiner

PRIOR ART

HYDROCRACKING PROCESS AND DEVICE WITH REDUCTION OF POLYNUCLEAR AROMATIC COMPOUNDS

FIELD OF THE INVENTION

The present invention relates to a process and a device for reducing the concentration of heavy polycyclic aromatic compounds (HPNA) in a recycle loop of hydrocracking units.

PRIOR ART

Hydrocracking processes are routinely used in refining in order to transform mixtures of hydrocarbons into products which are easy to upgrade. These processes may be used to transform light cuts such as gasolines, for example, into lighter cuts (LPG). However, they are also routinely used to convert heavier feeds (such as heavy synthetics or oil cuts, for example gas oils obtained from vacuum distillation or effluents from a Fischer-Tropsch unit) into gasoline or naphtha, kerosene or gas oil. This type of process is also used to produce oils. In order to increase the conversion of hydrocracking units, a portion of the unconverted feed is recycled either to the reaction section into which it has already passed, or into an independent reaction section. In the recycle loop, this results in an unwanted accumulation of polycyclic aromatic compounds (HPNA) formed in the reaction section during the cracking reactions. These compounds poison the hydrocracking catalyst, which reduces the catalytic activity as well as the cycle time. They can also precipitate or become deposited in the cold parts of the unit, generating malfunctions thereby.

HPNA compounds are defined as polycyclic or polynuclear aromatic compounds, which thus comprise a plurality of condensed benzene rings or nuclei. They are usually known as HPA, standing for Heavy Polynuclear Aromatics, PNA or HPNA.

Typically, what are known as heavy HPNAs comprise at least 4 or in fact at least 6 benzene rings in each molecule. The compounds with fewer than 6 rings (for example pyrene derivatives) can be hydrogenated more easily and thus are less likely to poison the catalysts. As a consequence, we were more particularly interested in the compounds which are the most representative of families containing 6 aromatic rings or more, such as coronene (a compound containing 24 carbons), dibenzo(e,ghi) perylene (26 carbons), naphtho [8.2.1,abc] coronene (30 carbons) and ovalene (32 carbons), which are the compounds which are the most readily identifiable and quantifiable, for example by chromatography.

The patent U.S. Pat. No. 7,588,678 describes a hydrocracking process with a recycle of the unconverted 380° C.+ fraction, in which process the HPNA compounds are eliminated from the recycled fraction by means of an adsorbent. Other techniques for reducing the quantity or for eliminating HPNAs are described in the prior art of that patent, such as for example by reducing them by means of a hydrogenation or precipitating them followed by a filtration. The Applicant has investigated a process which does not use those techniques to separate the HPNAs.

The patent U.S. Pat. No. 4,961,839 describes a hydrocracking process which can be used to increase the conversion per pass by using high hydrogen flow rates in the reaction zone, by vaporizing a large proportion of the hydrocarbons sent to the column for separation of the products and by concentrating the polycyclic aromatic compounds into a small heavy fraction which is extracted from that column. In that process, a heavy fraction is withdrawn from a plate located above the supply point and below the point from which diesel distillate is withdrawn; that heavy fraction is recycled to the hydrocracker. The bottom of the column (residue) is recycled directly to the fractionation column. That type of technology can indeed reduce the concentration of HPNA in the recycling loop for the reactor, but results in significant losses in yield and high costs linked to the quantities of hydrogen.

The patent U.S. Pat. No. 3,377,267 describes a hydrocracking process in which the hydrocracked effluent passes into a high pressure hot separator drum, and all or a portion of the bottom fraction from the high pressure hot separator drum is stripped in a stripping column with the aid of steam and using a counter-current. A portion of the bottom fraction from the stripping column constitutes the purge from the unit; the other portion is recycled to the reactor. In that configuration, the stream which is recycled to the reaction section is very rich in HPNA because it has the same composition as the stream for purging the HPNA from the unit. On the other hand, both the step for purging the HPNA and the step for separating the unconverted products, which are recycled to the reaction section, and upgradable products, are carried out in said stripping column.

The patent applications WO 2012/052042 and WO 2012/052116 (corresponding to US 2013/0220885) describe a hydrocracking process in which a portion of the bottom fraction from the fractionation column (residue) is recycled to the reaction section. The other portion of the bottom fraction from the fractionation column is stripped in a stripping column using a counter-current. The gaseous fraction obtained after stripping is sent to the fractionation column and at least a portion of the heavy fraction obtained from stripping is purged, the other portion of that fraction possibly being recycled to the stripping column. The operating conditions for the fractionation column and for the stripping column are linked, because the gaseous effluent from the stripping column constitutes one of the feeds for the fractionation column, and a portion of the bottom portion from the fractionation column constitutes the feed for the stripping column.

Those processes can be used to reduce the quantity of HPNA, to the detriment of the hydrocracking yields, the operating costs and/or the operability of the unit.

The Applicant's patent applications FR 3 030 564 A, FR 3 030 565 A and FR 3 030 566 A describe a hydrocracking process in which a heavy fraction is withdrawn as a side stream from the principal fraction column and is optionally stripped as a counter-current in a stripping column. That heavy fraction, or the heavy fraction resulting from stripping, which is less concentrated in HPNA, is then mixed with a portion of the fraction recovered from the bottom of the fractionation column, which is more concentrated in HPNA, before being recycled to the reaction section. The other portion of the fraction recovered from the bottom of the fractionation column constitutes the purge of the unit.

Figure 1:
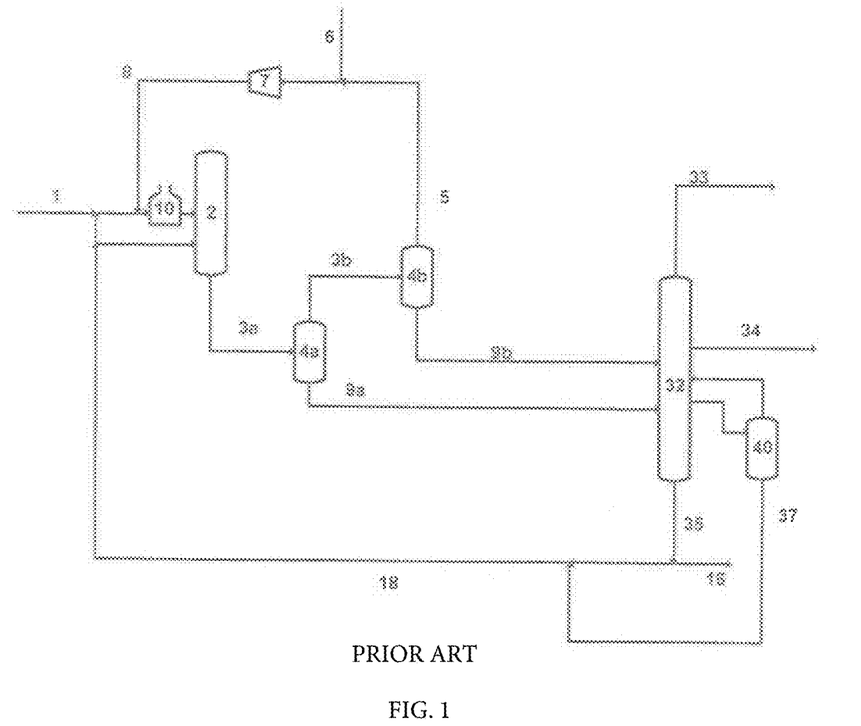

FIG. 1 describes a prior art hydrocracking device in which the effluent obtained from the hydrocracking reaction section 2 is sent in succession to the separator drums 4a and 4b, then directly to the fractionation section 32. The treatment of the HPNAs is carried out in a stripper 40 positioned to one side and downstream with respect to the fractionation section 32.

In particular, the device of FIG. 1 comprises:
 a conduit 1 for introducing feed into a furnace 10, a conduit 8 for introducing hydrogen into the feed, said furnace being provided with an outlet conduit for the heated feed going towards a hydrocracking reaction section 2, said section being provided with a conduit 3a for withdrawing hydrocracked effluent, a high pressure hot separator 4a provided with a conduit 3a for introducing hydrocracked effluent, and the head of the separator being provided with a conduit 3b for evacuating a gaseous effluent and said separator being provided with a conduit 9a for withdrawing a heavy effluent, a high pressure cold separator 4b provided with a conduit 3b for introducing gaseous effluent obtained from the high pressure hot separator 4a, a conduit 5 for evacuating a gaseous effluent and said separator being provided with a conduit 9b for withdrawing a heavy effluent, a zone 7 for compression of at least a portion of the gaseous effluent obtained from the high pressure cold separator 4b, a conduit 6 for introducing hydrogen into the conduit 5, and a conduit 8 for introducing a compressed gaseous stream into the feed, a fractionation section comprising a fractionation column 32 provided with a conduit 9a for introducing heavy effluent obtained from the high pressure hot separator 4a, a conduit 9b for introducing heavy effluent obtained from the high pressure cold separator 4b, a conduit 33 for evacuating gases, a conduit 34 for evacuating the naphtha fraction, a conduit 36 for evacuating the gas oil fraction and a conduit 35 at the bottom of the column for withdrawing a residue, said conduit 35 allowing all or a portion of said residue to be recycled to the reaction section 2 via the conduit 18 and allowing for a purge via the conduit 16, a stripper 40 laterally of the fractionation section 32 provided with a conduit for introducing a portion of the effluent fractionated in said section 32, a conduit for recycling gaseous effluent towards said section 32, and a conduit 37 for evacuating heavy effluent towards the recycling conduit 18.

In the field of the invention, the person skilled in the art will thus be constantly seeking to limit the accumulation of HPNAs in the recycling loop, for example by means of a HPNA-rich purge, in order to prevent the premature deactivation of the catalysts employed, while separating the upgradable end products and the unconverted products. The term "purge" means the evacuation of a stream outside the process employed. The unconverted products are recycled to the reaction section of the unit in order to maximize the yields.

Surprisingly, the Applicant has discovered that it is possible to uncouple the step for purging the HPNAs and the step for separating the unconverted products and the upgradable products and thus to treat these two steps separately, which has the advantage of adapting the operating conditions and thus the performances to each of the steps. This results in a significantly improved reduction in the quantity of HPNA.

Advantageously, the process in accordance with the invention can be used to increase the cycle time and service life of the catalyst employed in the hydrocracking step a).

The process in accordance with the invention proposes adding a separation column of the stripper or reboiler column type upstream of the fractionation section, in order to treat at least a portion of the heavy effluent obtained from the high pressure hot separator. All or a portion of the bottom fraction constituted by unconverted products obtained from the fractionation section is recycled to the reaction section. The process in accordance with the invention does not include a stripper placed downstream of the fractionation column as in the prior art process.

SUMMARY OF THE INVENTION

It should be pointed out here that throughout the description, the expression "in the range . . . to . . . " should be understood to include the cited limits.

In the context of the present invention, the various embodiments presented may be used alone or in combination with each other.

In order to facilitate comprehension of the invention, the numbering of the equipment employed and illustrated in the figures is indicated in the description, without limiting its scope. The numbering of the streams in the description of the process in accordance with the invention corresponds to the numbering of the conduits in the device.

In one aspect, the present invention provides a process for hydrocracking a feed comprising 20% to 100% by volume of compounds, said feed having a boiling temperature of more than 340° C., preferably more than 370° C., a sulphur content in the range 0.01% to 5% by weight, a nitrogen content of more than 500 ppm by weight, preferably in the range 500 to 1000 ppm by weight, a cumulative nickel and vanadium content of less than 2 ppm by weight and an asphaltenes content of less than 3000 ppm by weight, preferably less than 1000 ppm by weight, said process comprising:

a) a step a) for hydrocracking said feed, at a temperature of more than 200° C., a pressure of more than 1 MPa, a space velocity in the range 0.1 to 20 $h^{-1}$ and a volume ratio, in litre of hydrogen/litre of feed, in the range 80 to 5000, and a hydrocracked effluent is obtained, b) a step b) for separating the effluent obtained from the hydrocracking step a) carried out in a hot separation zone comprising a high pressure hot separator, said pressure being more than 0.5 MPa and less than the pressure employed in the hydrocracking step a), and the temperature being in the range 200° C. to 450° C., and a gaseous effluent is obtained from the head of the high pressure hot separator and a heavy effluent is obtained from the bottom of the high pressure hot separator, c) a step c) for separating the gaseous effluent obtained from step b) at the head of the high pressure hot separator carried out in a cold separation zone comprising a high pressure cold separator at a temperature in the range 0° C. to 200° C., and at a pressure of more than 0.5 MPa and less than the pressure employed in step b), and a gaseous effluent is obtained from the head of the high pressure cold separator and a heavy effluent is obtained from the bottom of the high pressure cold separator, d) a step d) for separation of the heavy effluent obtained from step b), carried out in a separation column selected from a stripper or a reboiler column, and a gaseous effluent is obtained from the head of said column and a residue from the bottom of the column, and at least a portion of said residue, concentrated in HPNA, is eliminated by the purge, e) a step e) for fractionation of the heavy effluent obtained from step c) and of the gaseous effluent obtained in step d), said step being carried out in a fractionation section, and at least one naphtha fraction, at least one gas oil fraction, and a residue are obtained and said residue is recycled, in part or in its entirety, to the hydrocracking step a).

In a particular embodiment, the feed is treated prior to step a) by hydrorefining.

In a particular embodiment, the process comprises a step b') for separation carried out in the hot separation zone, in which the heavy effluent obtained from the separation step b) is treated in a medium pressure hot separator at a pressure below 4.5 MPa and at a temperature in the range 200° C. to 450° C., and a gaseous effluent and a heavy effluent are obtained, said heavy effluent being sent to step d).

In a particular embodiment, the separation step c) is carried out in a separator selected from a flash drum, a stripper or a simple distillation column, and at a pressure which is lower than the pressure of step b) by 0.1 MPa to 1.0 MPa.

In another particular embodiment, the process comprises a step c') for separation, carried out in the cold separation zone, of the heavy effluent obtained from step c) and/or the gaseous effluent obtained from step b'), at a pressure of less than 4.5 MPa and at a temperature in the range 0° C. to 200° C., and a gaseous effluent and a heavy effluent are obtained which are sent to step e).

In another particular embodiment, the separation step d) is carried out by stripping using a gas selected from hydrogen and steam at a pressure in the range 0.1 MPa to 2.0 MPa.

In another particular embodiment, the process comprises a step d') for separation of at least one effluent obtained from the separation step d) or obtained from step c'), carried out by stripping by means of a gas selected from hydrogen and steam, at a pressure in the range 0.2 MPa to 2.5 MPa.

In another particular embodiment, the fractionation section employed in step e) comprises one or more distillation columns in which the pressure is in the range 0.01 MPa to 0.5 MPa.

In another particular embodiment, all or a portion of the heavy effluent obtained from step b) or from step b') is sent to the separation column used in step d), preferably in the range 0.1% to 100% by weight with respect to the total stream obtained from step b) or b') (9a), preferably in the range 0.1% to 50% by weight, preferably in the range 0.1% to 10% by weight.

In another particular embodiment, the effluents entering the fractionation section 32 are heated to a temperature in the range 200° C. to 450° C.

These embodiments may be combined.

In a further aspect, the invention concerns a device comprising:
- a hydrocracking reaction section 2 provided with a conduit 1 for introducing feed, and a conduit 8 for introducing hydrogen entering the reaction section 2, said section being provided with a conduit 3a for withdrawing hydrocracked effluent,
- a first hot separation zone comprising a high pressure hot separator 4a provided with a conduit 3a for introducing hydrocracked effluent and provided at the head of the separator with a conduit 3b for evacuating a gaseous effluent and said zone being provided with a conduit 9a for withdrawing a heavy effluent,
- a second cold separation zone comprising a high pressure cold separator 4b provided with a conduit 3b for introducing gaseous effluent obtained from the high pressure hot separator 4a, a conduit 5 for evacuation of a gaseous effluent, and said zone being provided with a conduit 9b for withdrawing a heavy effluent,
- a zone 7 for compressing at least a portion of the gaseous effluent obtained from the high pressure cold separator 4b, a conduit 6 for introducing hydrogen into the hydrocracking section 2, and a conduit 8 for introducing a compressed gaseous stream into the hydrocracking section 2,
- a separation column 20 provided with a conduit 9a3 for introducing all or a portion of the heavy effluent 9a obtained from the high pressure high temperature separator 4a, provided with a conduit located at the bottom of the column for withdrawing a residue containing HPNAs, said residue being evacuated from the process, in part or in its entirety, via the purge conduit 16, and said column being provided at its head with a conduit 22 for evacuating a gaseous effluent,
- a fractionation section comprising a fractionation column 32 provided with a conduit 22 for introducing gaseous effluent obtained from said separation column, a conduit 9b for introducing heavy effluent obtained from the high pressure cold separator 4b, a conduit 33 for the evacuation of gas, a conduit 34 for the evacuation of the naphtha fraction, a conduit 36 for the evacuation of a gas oil fraction and a conduit 18 at the column bottom for withdrawing a residue, said conduit 18 allowing all or a portion of said residue to be recycled from the fractionation section 32 to the reaction section 2.

In a variation, the device further comprises, in the first hot separation zone, a medium pressure hot separator 4c provided with a conduit 9a1 for introducing heavy effluent obtained from the high pressure hot separator 4a, provided with a conduit 9a for withdrawing a heavy effluent and a conduit 11a for gaseous effluent.

In a further variation, the device also comprises, in the second cold separation zone, a medium pressure cold separator 4d provided with a conduit 9b1 for introducing heavy effluent obtained from the high pressure cold separator 4b, provided with a conduit 9b for withdrawing a heavy effluent and a conduit 11b for gaseous effluent.

In a further variation, the device also comprises, in the fractionation section, a separation column 12 provided with at least one conduit 9b for introducing heavy effluent obtained from a separator of the cold separation zone, provided with a conduit 19 for the evacuation of gaseous effluent and a conduit 14 for withdrawing heavy effluent.

These variations of the device may be combined.

BRIEF DESCRIPTION OF THE DRAWINGS

FIG. 1, in accordance with the prior art, and FIGS. 2, 3, 4 and 5, in accordance with the invention, use the same numbering for the same equipment of the device.

The subject matter of the invention, illustrated in FIGS. 2, 3, 4 and 5, differs from the prior art illustrated in FIG. 1 in that:

in the process in accordance with the invention (FIGS. 2, 3, 4 and 5), the heavy fraction of the reactor effluent which is richest in polynuclear aromatic compounds (HPNA) obtained from the reactions is removed in a purge upstream of the fractionation section 32 in the separation column 20. Advantageously, the operating conditions of the separation column 20 are independent of those of the fractionation section 32;

the separation of the upgradable products and the unconverted products recycled to the reaction section (via the conduit 18) is carried out downstream of the removal of the purge from the unit (stream 16) in the fractionation section 32, wherein the operating conditions are independent of those for the separation column 20;

the process in accordance with the invention can be used to adapt the operating conditions of each of the steps, the HPNA purge and the separation of the unconverted products from the upgradable products. This adaptation results in a reduction in the accumulation of HPNA in the recycling loop. This reduction in the accumulation of HPNA in the recycling loop means that premature deactivation of the catalysts employed can be reduced, and thus their cycle times and service lives can be increased.

DETAILED DESCRIPTION OF THE INVENTION

Step a) for Hydrocracking, Carried Out in a Reaction Section 2 for Hydrocracking:

In accordance with the invention, the process comprises a step a) for hydrocracking a feed 1 preferably comprising 20% to 100% by volume of compounds with a boiling temperature of more than 200° C., a sulphur content in the range 0.01% to 5% by weight, a nitrogen content of more than 500 ppm by weight, a cumulative nickel and vanadium content of less than 2 ppm by weight and an asphaltenes content of less than 3000 ppm by weight, preferably less than 1000 ppm by weight; said step for hydrocracking said feed is carried out at a temperature of more than 200° C., a pressure of more than 1 MPa, a space velocity in the range 0.1 to 20 h$^{-1}$ and a volume ratio, in litre of hydrogen/litre of feed, in the range 80 to 5000.

Hydrocracking step a) is carried out at a temperature of more than 200° C., preferably in the range 250° C. to 480° C., preferably in the range 320° C. to 450° C., and particularly preferably in the range 330° C. to 435° C., at a pressure of more than 1 MPa, preferably in the range 2 to 25 MPa, particularly preferably in the range 3 to 20 MPa, the space velocity being in the range 0.1 to 20 h$^{-1}$ and preferably in the range 0.1 to 6 h$^{-1}$, more preferably in the range 0.2 to 3 h$^{-1}$, and the quantity of hydrogen introduced is such that the volume ratio of litres of hydrogen/litres of hydrocarbon is in the range 80 to 5000 l/l, preferably in the range 100 to 2000 l/l.

These operating conditions used in the hydrocracking processes can generally be used to obtain conversions of products with boiling temperatures of less than 340° C., and preferably less than 370° C., per pass of more than 15% and preferably in the range 20% to 95%.

Preferably, the feed 1 treated in the hydrocracking step a) may be LCO (light cycle oil—gaseous gas oils obtained from a catalytic cracking unit), atmospheric distillates, vacuum distillates, for example gas oils obtained from straight run distillation of crude oil or from conversion units such as FCC, the coker or from visbreaking, as well as feeds originating from units for the extraction of aromatics from lube base oils or obtained from solvent dewaxing of lube base oils, or in fact from distillates obtained from processes for the fixed bed or ebullated bed desulphurization or hydroconversion of ARs (atmospheric residues) and/or VRs (vacuum residues) and/or deasphalted oils, or in fact the feed may be a deasphalted oil, effluents from a Fischer-Tropsch unit or in fact any mixture of the feeds mentioned above. The above list is not limiting.

The feed 1 treated in the hydrocracking step a) comprises 20% to 100% by volume, preferably 20% to 95% by volume, preferably 50% to 95% by volume and more preferably 70% to 95% by volume of compounds with a boiling point of more than 200° C., preferably more than 300° C., more preferably more than 370° C.

The nitrogen content of the feeds 1 treated in the hydrocracking processes is more than 500 ppm by weight, preferably in the range 500 to 10000 ppm by weight, more preferably in the range 700 to 4500 ppm by weight and yet more preferably in the range 1000 to 4500 ppm by weight.

Preferably, the sulphur content in the feeds 1 treated in the hydrocracking processes is in the range 0.01% to 5% by weight, more preferably in the range 0.2% to 4% and yet more preferably in the range 0.5% to 3%. The feed may optionally contain metals. The cumulative nickel and vanadium content of the feeds treated in the hydrocracking processes is preferably less than 2 ppm by weight. The asphaltenes content is less than 3000 ppm by weight, preferably less than 1000 ppm by weight, and more preferably less than 300 ppm by weight.

The hydrocracking catalyst is brought into contact, in the presence of hydrogen, with the feeds described above.

The hydrocracking is carried out in a fixed bed or ebullated bed, preferably in a fixed bed, and in one or more reactors.

The hydrocracking step a) may be operated in a single or in a plurality of ebullated bed reactors, with or without intensive recycling of the unconverted fraction, optionally in association with a hydrorefining catalyst located in a fixed bed or ebullated bed reactor upstream of the hydrocracking catalyst. The ebullated bed is operated with the withdrawal of spent catalyst and the daily addition of fresh catalyst in order to keep the activity of the catalyst stable.

The hydrocracking step a) in accordance with the invention covers the fields of pressure and conversion extending from mild hydrocracking to high pressure hydrocracking. It may be carried out in accordance with a number of variations.

The term "mild hydrocracking" means hydrocracking resulting in moderate conversions, generally below 40%, and functioning at low pressure, generally between 2 MPa and 9 MPa. The hydrocracking catalyst may be used alone, in a single or in a plurality of fixed bed catalytic beds, in one or more reactors, in what is known as a once-through hydrocracking layout, with or without intensive recycling of the unconverted fraction, optionally in association with a hydrorefining catalyst located upstream of the hydrocracking catalyst.

The high pressure hydrocracking is carried out at a pressure of more than 9 MPa, and usually more than 10 MPa.

In accordance with a first variation, the hydrocracking step a) may be operated in accordance with what is known as a two-step hydrocracking layout with intermediate separation between the two reaction zones. In a given step, the hydrocracking catalyst may be used in one or more reactors in association or otherwise with a hydrorefining catalyst located upstream of the hydrocracking catalyst.

The hydrocracking step a) may be operated in accordance with a second variation, termed a once-through step. This variation generally firstly comprises an intensive hydrorefining which is intended to carry out an intensive hydrodenitrogenation and an intensive hydrodesulphurization of the feed before it is sent to the hydrocracking catalyst proper, in particular in the case in which it comprises a zeolite. This intensive hydrorefining of the feed causes only limited conversion of this feed. The conversion, which remains insufficient, then has to be completed over a more active hydrocracking catalyst.

In the case in which the hydrocracking step a) comprises recycling of the unconverted fraction, the recycle stream may either be supplied directly to the hydrocracking reactor, or be mixed with the feed supplying said hydrocracking reactor.

In general, the hydrocracking section 2 contains one or more beds of hydrocracking catalysts which may be identical or different. Optionally, said hydrocracking catalysts are used in combination with one or more hydrotreatment catalysts. The hydrocracking and hydrotreatment catalysts (also termed hydrorefining in the text) are well known to the person skilled in the art. They contain a support and at least one metal selected from groups VIII and/or VIB. In general, the metal from group VIII is nickel and/or cobalt and the metal from group VIB is molybdenum and/or tungsten.

The support for the hydrocracking catalysts generally comprises a silica-alumina and/or a zeolite, and a binder, usually alumina. The support for the hydrotreatment catalysts is generally based on alumina.

Preferably, the catalyst or the catalysts employed in the hydrocracking step a) may or may not have been impregnated with an active phase. Preferably, the catalysts are impregnated with a hydrodehydrogenating phase. More preferably, the CoMo or NiMo phase is used. These catalysts may exhibit macroporosity.

The zeolites which may be used are natural or synthetic and may, for example, be selected from X, Y or L zeolites, faujasite, beta zeolite, mordenite, erionite or chabasite, used alone or as mixtures. Preferably, Y zeolite and faujasite are used.

In the case in which the feed contains resin and/or asphaltene type compounds, it may be advantageous to treat said feed on a bed of catalyst, a guard bed or bed of adsorbent which is different from the hydrocracking catalyst, prior to step a). The catalysts or guard beds used are in the form of spheres or extrudates. Any other form known to the person skilled in the art may be used. Preferably, the forms are selected from hollow cylinders, hollow rings, Raschig rings, toothed hollow cylinders, crenellated hollow cylinders, "pentaring" wheels, multi-hole cylinders and any other form known to the person skilled in the art.

Preferably, at least one furnace 10 heats the feed upstream of the reaction section 2 or, in a variation, only the hydrogen necessary for said reaction section 2 or, in accordance with another variation, the hydrogen and the feed before introducing them into the reaction section 2.

The hydrogen used may be mixed with said feed 1 and/or introduced directly into the reaction section 2. In all of these variations, the hydrogen is introduced via the conduit 8.

Step b) for Separation in a High Pressure Hot Separator (4a)

In accordance with the invention, the process comprises a step b) for separation of the effluent obtained from the hydrocracking step a) by using at least one high pressure hot separator 4a. In said step b), a gaseous effluent is obtained from the head of the high pressure hot separator and a heavy effluent is obtained from the bottom of the high pressure hot separator.

The high pressure hot separator 4a used in step b) can be used to separate the heavy effluent and gas present in the effluent obtained from the hydrocracking step a). Any type of hot separator employed for this separation which is known to the person skilled in the art may be used. Preferably, said high pressure hot separator is selected from a flash drum, a stripper, or a simple distillation column. Preferably, the high pressure hot separator is a flash drum.

The high pressure hot separator 4a is operated at a pressure of more than 0.5 MPa, preferably in the range 1.5 to 25 MPa, particularly preferably in the range 2.5 to 20 MPa. Typically, the pressure is lower than the pressure employed in the hydrocracking step a), preferably lower by 0.1 MPa to 1.0 MPa. The temperature of the high pressure hot separator 4a is in the range 200° C. to 450° C., preferably in the range 250° C. to 380° C. and particularly preferably in the range 260° C. to 360° C.

Optional Step b') for Separation in a Medium Pressure Hot Separator (4c)

Optionally, the heavy effluent 9a1 obtained from the bottom of the high pressure hot separator 4a of step b) is treated in a medium pressure hot separator 4c.

Preferably, the heavy stream 9a1 obtained from the high pressure hot separator 4a is decompressed in a valve or a turbine and directed into a medium pressure hot separator 4c.

The total pressure of the separator 4c is preferably that required, according to the knowledge of the person skilled in the art, to efficiently recover the hydrogen comprised in the gaseous fraction separated in the medium pressure hot separator 4c, and/or to supply the medium pressure cold separator 4d with the gaseous stream 11a separated in the medium pressure hot separator 4c. The pressure of the medium pressure hot separator 4c is less than 4.5 MPa, preferably in the range 1.0 MPa to 4.5 MPa, preferably in the range 1.5 MPa to 3.5 MPa.

The temperature of the medium pressure hot separator 4c is in the range 200° C. to 450° C., preferably in the range 250° C. to 380° C. and more preferably in the range 260° C. to 360° C.

Any type of medium pressure hot separator employed for this separation which is known to the person skilled in the art may be used. Preferably, said medium pressure hot separator is selected from a flash drum, a stripper or a simple distillation column. Preferably, the medium pressure hot separator is a flash drum.

Step c) for Separation in a High Pressure Cold Separator (4b)

In accordance with the invention, the process comprises a step c) for separation of the gaseous effluent 3b obtained from the head of the high pressure hot separator 4a of step b), which is treated in a high pressure cold separator 4b at a temperature in the range 0° C. to 200° C. In said step c), a gaseous effluent is obtained at the head of the high pressure cold separator and a heavy effluent is obtained from the bottom of the high pressure cold separator.

The high pressure cold separator 4b, the feed for which is the gaseous stream obtained from the high pressure hot separator 4a, is used at a pressure of more than 0.5 MPa, preferably in the range 1.5 to 25 MPa, more preferably in the range 2.5 to 20 MPa. Typically, the pressure is less than the pressure employed in step b), preferably lower by 0.1 MPa to 1.0 MPa.

The temperature of the high pressure cold separator 4b is in the range 0° C. to 200° C., preferably as low as possible considering the cooling means which are known to the person skilled in the art and which may be used within the industrial constraints. Said cooling can maximize the purity of the recycled hydrogen.

Any type of cold separator which can allow this separation which is known to the person skilled in the art may be used. Preferably, said high pressure cold separator is selected from a flash drum, a stripper, or a simple distillation column. Preferably, the high pressure cold separator is a flash drum.

The gaseous effluent 5 obtained from step c) leaving the head of the high pressure cold separator 4b, said gaseous effluent 5 also being known as recycled hydrogen, may optionally be purified in a column 5a before being compressed in the compression section 7 and sent via a conduit 8 to the feed 1 or to the reaction section 2. Advantageously, the gaseous effluent 5 obtained thereby from the head of the high pressure cold separator 4b comprises mainly hydrogen, i.e. between 50% and 100% by volume of hydrogen. Preferably, the hydrogen obtained is recycled to the hydrocracking step a) using any means known to the person skilled in the art.

Optional Step c') for Separation in a Medium Pressure Cold Separator (4d)

Optionally, the heavy effluent 9b1 obtained from the bottom of the high pressure cold separator 4b used in step c) is treated in a medium pressure cold separator 4d.

The heavy effluent 9b1 obtained from the bottom of the high pressure cold separator 4b at the end of step c) and/or the gaseous effluent 11a obtained from the head of the medium pressure hot separator 4c at the end of step b') is engaged in a separation step c') in a medium pressure cold separator 4d.

Optionally, the heavy effluent 9b1 obtained from the bottom of the high pressure cold separator 4b is decompressed in a valve or a turbine and directed into a medium pressure cold separator 4d.

The total pressure of said medium pressure cold separator 4d is preferably that required to efficiently recover the hydrogen comprised in the gaseous fraction separated in the medium pressure cold separator. This hydrogen recovery is preferably carried out in a pressure inversion adsorption unit. The pressure of the medium pressure cold separator 4d is below 4.5 MPa, preferably in the range 1.0 MPa to 4.5 MPa, preferably in the range 1.5 MPa to 3.5 MPa. The temperature of the medium pressure cold separator 4d is in the range 0° C. to 200° C., preferably as low as possible considering the cooling means known to the person skilled in the art and which can be used in accordance with industrial constraints. Said cooling can maximize the purity of the hydrogen in the gaseous fraction.

Any type of cold separator which allows this separation and which is known to the person skilled in the art may be employed. Preferably, said medium pressure cold separator is selected from a flash drum, a stripper, or a simple distillation column. Preferably, the medium pressure cold separator is a flash drum.

Preferably, a portion of the heavy effluent obtained from the bottom of the medium pressure cold separator 4d used in step c') may be re-injected into the high pressure cold separator 4b used in step c) in order to promote the dissolution of gaseous hydrocarbons in the heavy effluent obtained from the bottom thereof and thus maximize the purity of hydrogen in the recycle gas.

Step d) for Separation in a Separation Column (20)

In accordance with the invention, the process comprises a step d) for separation of at least one heavy effluent fraction 9a obtained from step b) or optionally from step b'). Said step d) is carried out in a separation column 20 selected from a stripper or a reboiler column. In said step d), a gaseous effluent is obtained from the head of said column and a residue from the bottom of the column. At least a portion of said residue, which is concentrated in HPNA, is eliminated by the purge (stream 16). The term "residue concentrated in HPNA" means a residue which is richer in HPNA than the feed for the separation column 20.

The separation column 20 is intended to concentrate the HPNAs in the heavy fraction of the effluent from the reaction section 2. Preferably, the separation column is a stripper. The stripping gas is, for example, a gas containing hydrogen or steam. Preferably, steam is used. Preferably, the pressure of this separation column 20 will be sufficiently high for the gas 22 obtained from the head of the separation column 20 to be capable of being sent to the fractionation section 32. The total pressure of the separation column is in the range 0.001 MPa to 2.0 MPa, preferably in the range 0.01 to 1.0 MPa, and more preferably in the range 0.1 to 0.5 MPa. The temperature of the supply to the separation column is in the range 200° C. to 450° C., preferably in the range 250° C. to 380° C. and more preferably in the range 260° C. to 360° C.

All or a portion of the heavy effluent obtained from step b) or from step b') is sent to the separation column 20, preferably in the range 0.1% to 100% by weight (by wt) with respect to the total stream obtained from step b) or b') (9a), preferably in the range 0.1% to 70% by weight, more preferably in the range 0.1% to 50% by weight, most preferably in the range 0.5% to 30% by weight, preferably in the range 0.5% to 10% by weight and particularly preferably in the range 0.1% to 10% by weight. The portion of the heavy effluent which is not directed to the separation column 20 is engaged in the fractionation step e) and/or in the separation step d').

The gaseous effluent 22 obtained from the head of the separator column 20 is engaged in the fractionation step e) and/or in the separation step d') described below.

Optional Step d') for Separation in a Separation Column (12)

Figure 4:
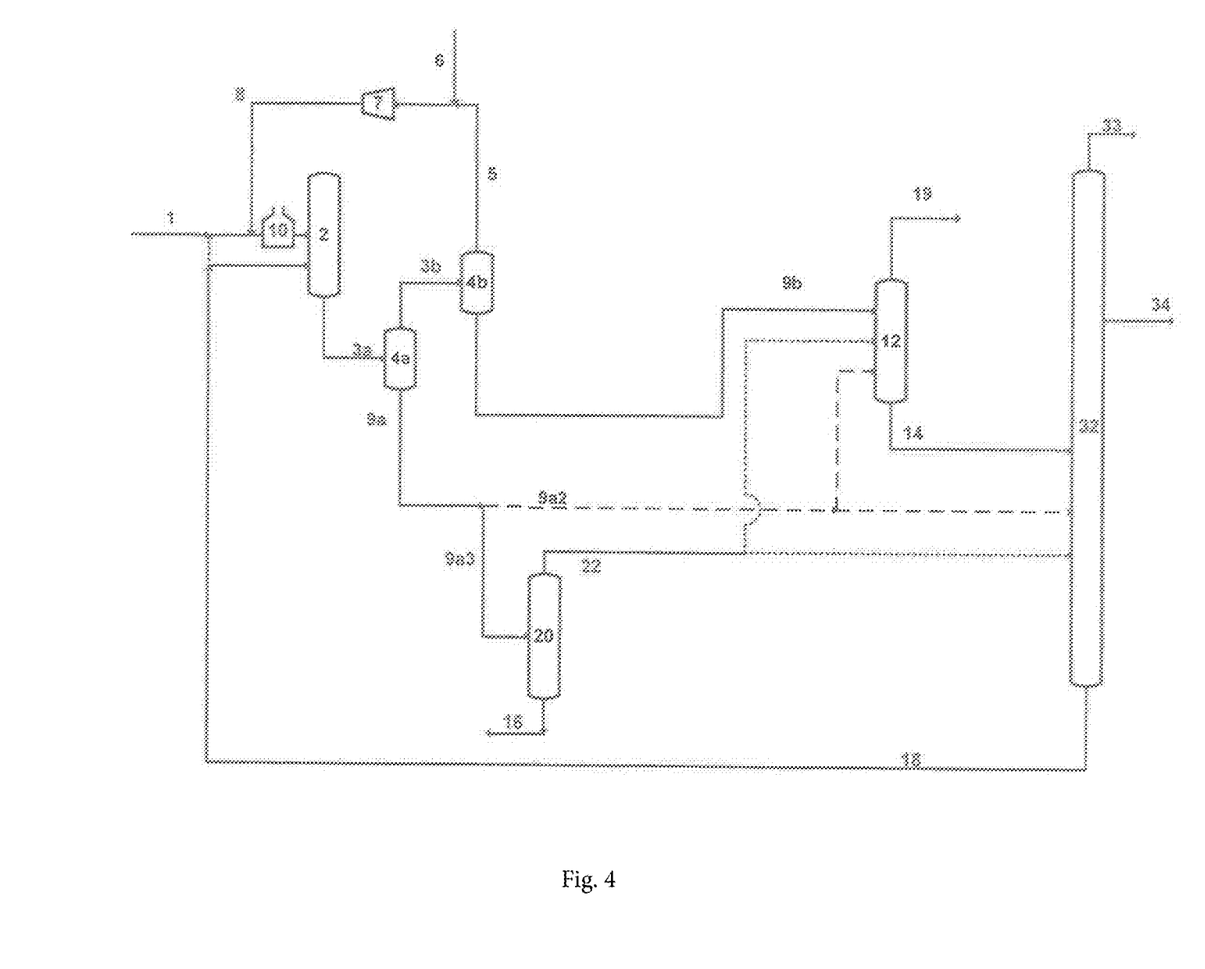
FIG. 4 describes the layout of the process of FIG. 2, additionally with a separation column 12 in the fractionation section.
Figure 5:
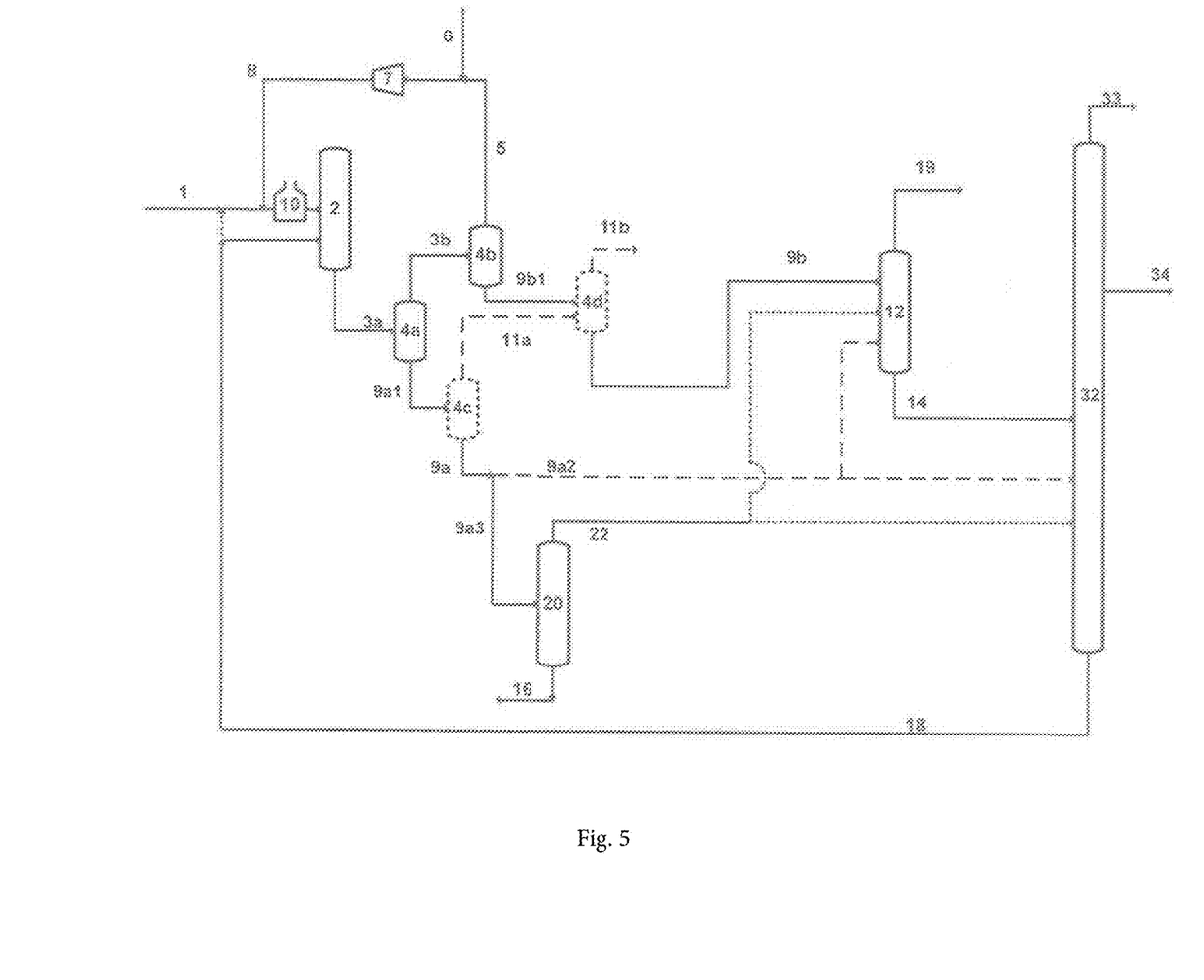
FIG. 5 shows a combination of the layout of the process of FIG. 2 with the cold (4d) and hot (4c) separators and the separation column 12.

In accordance with a variation of the invention shown in FIG. 4 and in FIG. 5, the effluent (stream 9b) obtained from step c) (FIG. 4) or from step c') (FIG. 5) is treated in a separation column 12 selected from a stripper or a reboiler column, in order to separate the cracked gases from at least one of the following unconverted products: naphtha (gaseous and heavy), diesel, kerosene or residue, and wherein the bottom product (stream 14) constitutes a feed for the fractionation section 32.

In a preferred variation, at least a portion of the gaseous fraction obtained from the head of the separation column 20 employed in step d) is supplied to the separation column 12 via the stream 22.

The separation column 12 is preferably stripped using any stripping gas such as, for example, a gas containing hydrogen or steam. Preferably, steam is used to carry out said stripping. The total pressure of the separation column 12 is typically in the range 0.2 MPa to 2.5 MPa, preferably in the range 0.3 to 2.0 MPa and particularly preferably in the range 0.4 to 1.0 MPa. The temperature of the supply to the separation column is in the range 150° C. to 450° C., preferably in the range 150° C. to 350° C. and particularly preferably in the range 200° C. to 340° C.

Step e) for Fractionation in a Fractionation Section (32)

In accordance with the invention, the process comprises a step e) for fractionation of one or more effluents obtained from step c) or c') or d') and of the gaseous effluent obtained from step d), said step being carried out in a fractionation section 32. In said step e), at least one naphtha fraction, at least one gas oil fraction and a residue are obtained. Optionally, a gaseous fraction may also be recovered.

Preferably, the fractionation section 32 is constituted by one or more columns comprising a plurality of internal packings and/or plates which may preferably be operated in counter-current mode. These columns may advantageously be stripped with steam and may comprise at least one reboiler in order to facilitate vaporization. Said vaporization can be used to separate the $H_2S$ and the gaseous components, for example methane, ethane, propane, butane, or effluents, as well as hydrocarbon cuts with boiling points in the gasoline, naphtha, kerosene, gas oil range and a heavy fraction 18 recovered from the column bottom wherein all or a portion may be recycled to the hydrocracking section. The total pressure of the columns of the fractionation section 32 is typically in the range 0.001 MPa to 0.5 MPa, generally in the range 0.01 MPa to 0.2 MPa, preferably in the range 0.1 to 0.2 MPa.

It is well known to the person skilled in the art that the various streams supplying the fractionation section 32 may either be supplied separately or be mixed, all together or in groups, before the fractionation section 32.

Various combinations of the streams supplying the fractionation section 32 may be envisaged as a function of the variations of the invention. Said streams supplying the fractionation section 32 correspond to the streams 9b obtained from the cold separation zone, the stream 9a2 obtained from stream 9a obtained from the hot separation zone, a gaseous stream 22 obtained from the separator 20, heavy stream 14 obtained from the separator 12 and optionally a heavy stream obtained from the separator 20.

The fractionation section comprises an atmospheric distillation column, and optionally a vacuum distillation column. In the case in which the fractionation section 32 comprises or is constituted by at least one atmospheric column and at least one vacuum column, the streams 9b and 22 supply the atmospheric column; the heavy effluent obtained from the separator 20, if appropriate, is sent either to the supply for the atmospheric column or to the supply to the vacuum column.

Optionally, at least one furnace may be used to heat at least one of the effluents entering the fractionation section 32, typically to a temperature in the range 200° C. to 450° C., preferably in the range 300° C. to 400° C.

In a particular embodiment of the invention, the process comprises the steps a), b), c), d), and e), or the steps a), b), b'), c), d), and e), or the steps a), b), c), c'), d), e) or the steps a), b), b') c), c', d), and e), or the steps a), b), c), d), d') and e), or the steps a), b), b'), c), d), d') and e), or the steps a), b), c), c'), d), d') and e), or the steps a), b), b'), c), c'), d), d') and e).

In a particular embodiment of the invention, the process is constituted by the steps a), b), c), d), and e), or the steps a), b), b'), c), d), and e), or the steps a), b), c), c'), d), e) or the steps a), b), b') c), c', d), and e), or the steps a), b), c), d), d') and e), or the steps a), b), b'), c), d), d') and e), or the steps a), b), c), c'), d), d') and e), or the steps a), b), b'), c), c'), d), d') and e).

Device

The invention also concerns a device which is advantageously employed in order to carry out the process in accordance with the invention.

Said device comprises:
- a hydrocracking reaction section 2 provided with a conduit 1 for introducing feed, and a conduit 8 for introducing hydrogen entering the reaction section 2, said section being provided with a conduit 3a for withdrawing hydrocracked effluent,
- a first hot separation zone comprising a high pressure hot separator 4a provided with a conduit 3a for introducing hydrocracked effluent and provided at the head of the separator with a conduit 3b for evacuating a gaseous effluent and said zone being provided with a conduit 9a for withdrawing a heavy effluent,
- a second cold separation zone comprising a high pressure cold separator 4b provided with a conduit 3b for introducing gaseous effluent obtained from the high pressure hot separator 4a, a conduit 5 for evacuation of a gaseous effluent, and said zone being provided with a conduit 9b for withdrawing a heavy effluent,
- a zone 7 for compressing at least a portion of the gaseous effluent obtained from the high pressure cold separator 4b, a conduit 6 for introducing hydrogen into the hydrocracking section 2, and a conduit 8 for introducing a compressed gaseous stream into the hydrocracking section 2,
- a separation column 20 provided with a conduit 9a3 for introducing all or a portion of the heavy effluent 9a obtained from the high pressure high temperature separator 4a, provided with a conduit located at the bottom of the column for withdrawing a residue containing HPNAs, said residue being evacuated from the process, in part or in its entirety, via the purge conduit 16, and said column being provided at its head with a conduit 22 for evacuating a gaseous effluent,
- a fractionation section comprising a fractionation column 32 provided with a conduit 22 for introducing gaseous effluent obtained from said separation column, a conduit 9b for introducing heavy effluent obtained from the high pressure cold separator 4b, a conduit 34 for the evacuation of the naphtha fraction, a conduit 36 for the evacuation of a gas oil fraction and a conduit 18 at the column bottom for withdrawing a residue, said conduit 18 allowing all or a portion of said residue to be recycled from the fractionation section 32 to the hydrocracking section 2.

In variations of the embodiments, the device furthermore comprises:
- upstream of the reaction section 2, a furnace 10 heating the feed or the mixture composed of the feed and hydrogen, provided with a conduit 1 for introducing said feed or said mixture and a conduit for extracting heated effluent into the reaction section 2,
- in the first hot separation zone, a medium pressure hot separator 4c provided with a conduit 9a1 for introducing heavy effluent obtained from the high pressure hot separator 4a, provided with a conduit 9a for withdrawing a heavy effluent and a conduit 11a for gaseous effluent,
- in the second cold separation zone, a medium pressure cold separator 4d provided with a conduit 9b1 for introducing heavy effluent obtained from the high pressure cold separator 4b, provided with a conduit 9b for withdrawing a heavy effluent and a conduit 11b for gaseous effluent, in the fractionation section, a separation column 12 provided with at least one conduit 9b for introducing heavy effluent obtained from a separator of the cold separation zone, and/or a conduit for introducing gaseous effluent obtained from step d) and provided with a conduit 19 for evacuating gaseous effluent and a conduit 14 for withdrawing heavy effluent, in the fractionation column 32, a conduit 33 for evacuating gases.

The device in accordance with the invention does not include a stripper positioned downstream of the fractionation section 32, i.e. used for the treatment of one or more effluents obtained from the fractionation section 32.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1663096, filed Dec. 22, 2016 are incorporated by reference herein.

EXAMPLES

The examples below illustrate the invention without limiting its scope.

In the examples below, the fractionation section 32 was constituted by a single atmospheric column.

In the examples below, the feed comprised 93% by volume of compounds with a boiling point of more than 340° C., a sulphur content of 3%, a nitrogen content of 1400 ppm by weight, a cumulative nickel and vanadium content of 1.3 ppm by weight and an asphaltenes content of 450 ppm by weight.

In the examples below, in the hydrocracking section, the hydrocracking catalyst was used at a temperature of 385° C., at a pressure of 13.9 MPa, a space velocity of 1.5 $h^{-1}$ and a volume ratio, in litre of hydrogen/litre of feed, of 900.

Example 1

Not in Accordance

This example was based on the configuration of FIG. 1. The properties and compositions are recorded in Table 1 below:

TABLE 1

Properties of streams in accordance with the layout of FIG. 1 at start-up (before HPNAs have accumulated)

| | | Configuration Stream of FIG. 1 | | | | | |
|---|---|---|---|---|---|---|---|
| Number of stream | | 1 | 9a | 16 | 18 | 35 | 37 |
| Yield with respect to stream 1 | % by wt | 100.0 | 65.1 | 0.5 | 90.0 | 64.1 | 26.4 |
| Quantity of diesel in the stream | % by wt | 22.0 | 18.1 | 2.0 | 3.2 | 2.0 | 6.1 |
| Specific gravity: SG[1] | | 0.923 | 0.823 | 0.844 | 0.843 | 0.844 | 0.841 |
| HPNA | | | | | | | |
| Coronene | ppm by wt | 0 | 7 | 6 | 5 | 6 | 4 |
| Dibenzo(e, ghi)perylene | ppm by wt | 0 | 1 | 1 | 1 | 1 | 0 |
| Naphto [8.2.1 abc] coronene | ppm by wt | 0 | 3 | 3 | 2 | 3 | 1 |
| Ovalene | ppm by wt | 0 | 2 | 2 | 2 | 2 | 0 |
| Total | ppm by wt | 0 | 13 | 12 | 10 | 12 | 5 |
| TBP, % by wt | | | | | | | |
| Initial boiling point | ° C. | 284 | (2) | 354 | 341 | 354 | 341 |
| 10% | ° C. | 356 | 295 | 410 | 398 | 410 | 387 |
| 50% | ° C. | 425 | 446 | 471 | 455 | 471 | 420 |
| 90% | ° C. | 519 | 529 | 537 | 530 | 537 | 480 |
| Final boiling point | ° C. | 588 | 559 | 559 | 559 | 559 | 545 |

[1]Specific gravity SG = $\rho_{sample}$ at 20° C./$\rho_{H2O}$ at 4° C., where $\rho$ is the density expressed in g/cm$^3$
(2): Data unavailable. Presence of a gaseous phase at atmospheric pressure.

TABLE 2

Properties of streams in accordance with the layout of FIG. 1 at stable operation (stable accumulation of HPNAs)

| | | Configuration Stream of FIG. 1 | | | | | |
|---|---|---|---|---|---|---|---|
| Number of stream | | 1 | 9a | 16 | 18 | 35 | 37 |
| Yield with respect to stream 1 | % by wt | 100.0 | 65.1 | 0.5 | 90.0 | 64.1 | 26.4 |
| Quantity of diesel in the stream | % by wt | 22.0 | 18.1 | 2.0 | 3.2 | 2.0 | 6.1 |
| Specific gravity: SG[1] | | 0.923 | 0.823 | 0.844 | 0.843 | 0.844 | 0.841 |

TABLE 2-continued

Properties of streams in accordance with the layout of FIG. 1 at stable operation (stable accumulation of HPNAs)

| Number of stream | | 1 | 9a | 16 | 18 | 35 | 37 |
|---|---|---|---|---|---|---|---|
| HPNA | | | | | | | |
| Coronene | ppm by wt | 0 | 1181 | 989 | 887 | 989 | 643 |
| Dibenzo(e, ghi)perylene | ppm by wt | 0 | 192 | 157 | 144 | 157 | 116 |
| Naphto [8.2.1 abc] coronene | ppm by wt | 0 | 403 | 384 | 294 | 384 | 78 |
| Ovalene | ppm by wt | 0 | 277 | 270 | 201 | 270 | 35 |
| Total | ppm by wt | 0 | 2053 | 1800 | 1526 | 1800 | 872 |
| TBP, % by wt | | | | | | | |
| Initial boiling point | ° C. | 284 | (2) | 354 | 341 | 354 | 341 |
| 10% | ° C. | 356 | 295 | 410 | 398 | 410 | 387 |
| 50% | ° C. | 425 | 446 | 471 | 455 | 471 | 420 |
| 90% | ° C. | 519 | 529 | 537 | 530 | 537 | 480 |
| Final boiling point | ° C. | 588 | 559 | 559 | 559 | 559 | 545 |

[1] Specific gravity SG = $\rho_{sample}$ at 20° C./$\rho_{H2O}$ at 4° C., where $\rho$ is the density expressed in g/cm³
[2]: Data unavailable. Presence of a gaseous phase at atmospheric pressure.

It should be noted that because of the configuration, streams 16 and 35 have exactly the same compositions and properties.

The operating conditions of the fractionation section 32 and of the lateral stripper 40 used are recorded in Table 3 below:

TABLE 3

Operating conditions for the fractionation section

FIG. 1

| Operating conditions for fractionation 32 | | |
|---|---|---|
| Pressure, top of column | MPa | 0.19 |
| Pressure, bottom of column | MPa | 0.24 |
| Feed temperature, inlet | ° C. | 380 |
| Number of theoretical plates | | 50 |
| Flow rate of stripping steam | kg/t [1] | 74 |

TABLE 3-continued

Operating conditions for the fractionation section

FIG. 1

| Operating conditions for lateral stripper 40 | | |
|---|---|---|
| Pressure, top of column | MPa | 0.23 |
| Pressure, bottom of column | MPa | 0.24 |
| Number of theoretical plates | | 6 |
| Flow rate of stripping steam | kg/t [1] | 122 |

[1] kg of steam/tonne of bottoms

Example 2

In Accordance with the Invention

Figure 2:
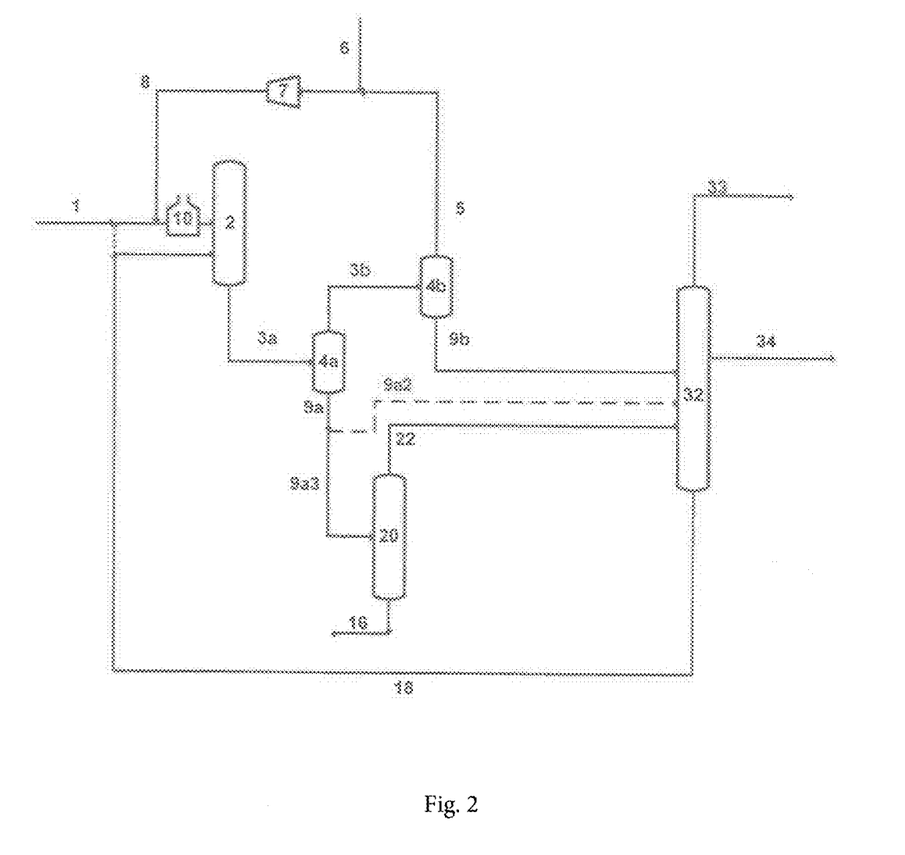
FIG. 2 describes a layout of the process in accordance with the invention, in which the separation column 20 is supplied with all or a portion of the bottom fraction of the high pressure hot separator drum 4a (stream 9a3). The purge from the unit (stream 16), concentrated in HPNA, constitutes all or a portion of the residue from the separation column 20. The gaseous fraction at the head of the separation column 20 (stream 22) and the bottom of the high pressure cold separator drum 4b (stream 9b) also constitute the supplies to the fractionation section 32.
Figure 3:
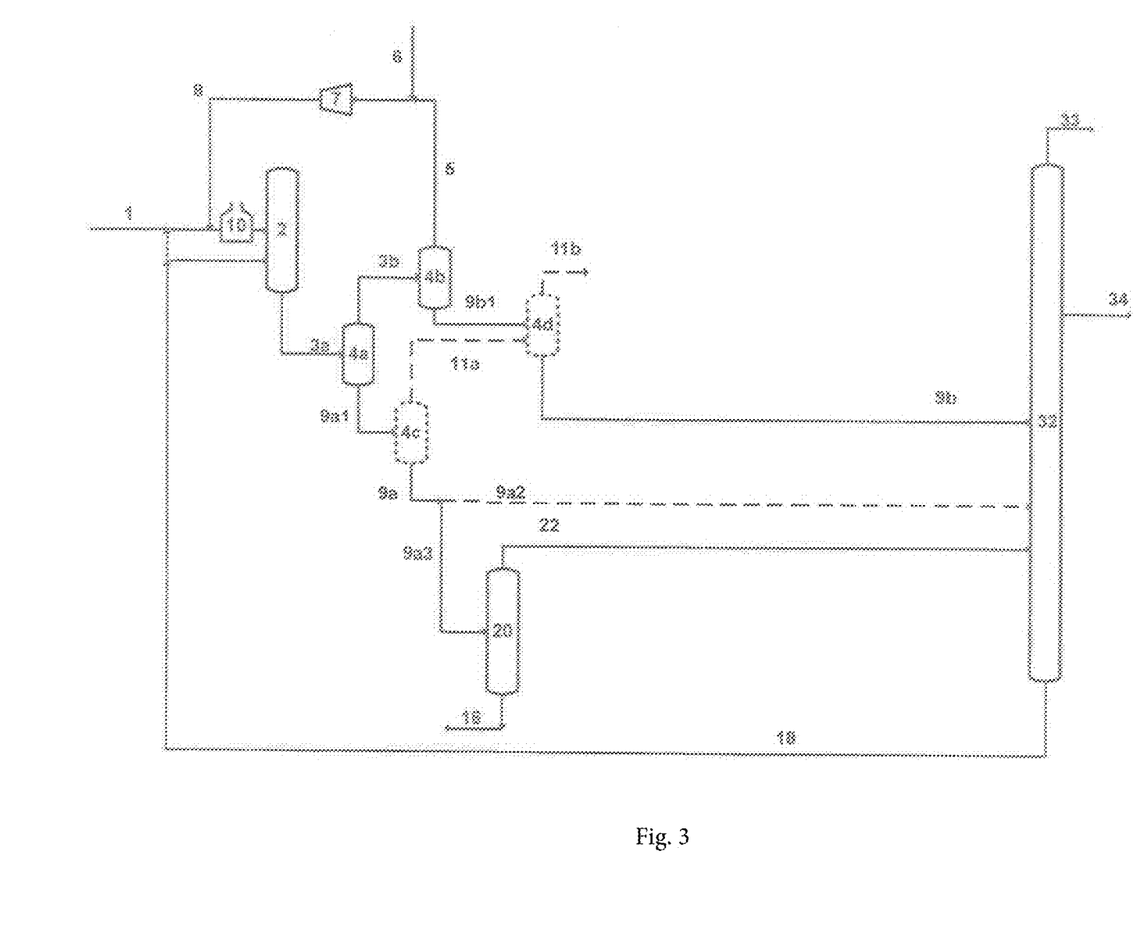
FIG. 3 describes the layout for the process of FIG. 2, additionally with a medium pressure cold separator 4d and a medium pressure hot separator 4c in the cold and hot separation zones respectively.

This example is in accordance with the invention and in accordance with FIG. 2, in which a portion of the stream 9a is sent to the conduit 9a3.

Tables 4 and 5 below provide the characteristics of the streams 9a, 9a2, 16, 18 and 22 in the configuration of the invention (FIG. 2). The operating conditions used are recorded in Table 4:

TABLE 4

Properties of streams in accordance with the layout of FIG. 2 at start-up (before HPNAs have accumulated)

| Number of stream | | 1 | 9a | 9a2 | 9a3 | 16 | 18 | 22 |
|---|---|---|---|---|---|---|---|---|
| Yield with respect to stream 1 | % by wt | 100.0 | 65.1 | 64.5 | 0.6 | 0.5 | 90.0 | 0.1 |
| Quantity of diesel in the stream | % by wt | 22.0 | 18.1 | 18.1 | 18.1 | 10.5 | 3.2 | 48.0 |
| Specific gravity: SG[1] | | 0.923 | 0.823 | 0.823 | 0.823 | 0.833 | 0.843 | 0.783 |
| HPNA | | | | | | | | |
| Coronene | ppm by wt | 0 | 7 | 7 | 7 | 9 | 5 | 0 |
| Dibenzo(e, ghi)perylene | ppm by wt | 0 | 1 | 1 | 1 | 1 | 1 | 0 |
| Naphto [8.2.1 abc] coronene | ppm by wt | 0 | 3 | 3 | 3 | 4 | 2 | 0 |
| Ovalene | ppm by wt | 0 | 2 | 2 | 2 | 3 | 2 | 0 |
| Total | ppm by wt | 0 | 13 | 13 | 13 | 17 | 10 | 0 |

TABLE 4-continued

Properties of streams in accordance with the layout
of FIG. 2 at start-up (before HPNAs have accumulated)

| | | Configuration Stream of FIG. 2 | | | | | | |
|---|---|---|---|---|---|---|---|---|
| Number of stream | | 1 | 9a | 9a2 | 9a3 | 16 | 18 | 22 |
| TBP, % by wt | | | | | | | | |
| Initial boiling point | ° C. | 284 | (2) | (2) | (2) | 290 | 349 | (2) |
| 10% | ° C. | 356 | 295 | 295 | 295 | 379 | 398 | 173 |
| 50% | ° C. | 425 | 446 | 446 | 446 | 455 | 294 | 465 |
| 90% | ° C. | 519 | 529 | 529 | 529 | 530 | 415 | 533 |
| Final boiling point | ° C. | 588 | 559 | 559 | 559 | 559 | 527 | 559 |

(1)Specific gravity SG = $\rho_{sample}$ at 20° C./$\rho_{H20}$ at 4° C., where $\rho$ is the density expressed in g/cm$^3$
(2): Data unavailable. Presence of a gaseous phase at atmospheric pressure.

TABLE 5

Properties of streams in accordance with the layout of FIG. 2 at stable operation (stable accumulation of HPNAs)

| | | Configuration Stream of FIG. 2 | | | | | | |
|---|---|---|---|---|---|---|---|---|
| Number of stream | | 1 | 9a | 9a2 | 9a3 | 16 | 18 | 22 |
| Yield with respect to stream 1 | % | 100.0 | 65.1 | 64.5 | 0.6 | 0.5 | 90.0 | 0.1 |
| Quantity of diesel in the stream | % | 22.0 | 18.1 | 18.1 | 18.1 | 10.5 | 3.2 | 48.0 |
| Specific gravity: SG(1) | | 0.923 | 0.823 | 0.823 | 0.823 | 0.833 | 0.843 | 0.783 |
| HPNA | | | | | | | | |
| Coronene | ppm | 0 | 826 | 826 | 826 | 989 | 619 | 1 |
| Dibenzo(e, ghi)perylene | ppm | 0 | 131 | 131 | 131 | 157 | 99 | 0 |
| Naphto [8.2.1 abc] coronene | ppm | 0 | 313 | 313 | 313 | 384 | 228 | 0 |
| Ovalene | ppm | 0 | 219 | 219 | 219 | 270 | 159 | 0 |
| Total | ppm | 0 | 1489 | 1489 | 1489 | 1800 | 1105 | 1 |
| TBP, % by wt | | | | | | | | |
| Initial boiling point | ° C. | 284 | (2) | (2) | (2) | 290 | 349 | (2) |
| 10% | ° C. | 356 | 295 | 295 | 295 | 379 | 398 | 173 |
| 50% | ° C. | 425 | 446 | 446 | 446 | 455 | 294 | 465 |
| 90% | ° C. | 519 | 529 | 529 | 529 | 530 | 415 | 533 |
| Final boiling point | ° C. | 588 | 559 | 559 | 559 | 559 | 527 | 559 |

(1)Specific gravity SG = $\rho_{sample}$ at 20° C./$\rho_{H20}$ at 4° C., where $\rho$ is the density expressed in g/cm$^3$
(2): Data unavailable. Presence of a gaseous phase at atmospheric pressure.

It should be noted that because of the configuration, the three streams 9a, 9a2 and 9a3 have the same properties and compositions.

TABLE 6

Operating conditions for columns

| | | FIG. 2 |
|---|---|---|
| Operating conditions for separation column 20 | | |
| Pressure, top of column | MPa | 0.25 |
| Pressure, bottom of column | MPa | 0.27 |
| Temperature of feed | ° C. | 347 |
| Number of theoretical plates | | 20 |
| Flow rate of stripping steam | kg/t (1) | 27 |
| Operating conditions for fractionation 32 | | |
| Pressure, top of column | MPa | 0.19 |
| Pressure, bottom of column | MPa | 0.24 |
| Temperature of feed | ° C. | 370 |
| Number of theoretical plates | | 50 |
| Flow rate of stripping steam | kg/t (1) | 106 |

(1) kg of steam/tonne of bottoms

Upon start-up of the units, the values for the streams 9a for the units in accordance with configurations 1 and 2 were identical (13 ppm by weight, see Tables 1 and 3). The values given in Tables 2 and 5 correspond to the composition of the various streams during a run, i.e. when the unit is in operation. However, during a run, the composition of the streams 9a of the two configurations during the course of accumulation changed very distinctly. In fact, the composition of the streams 9a were 2053 ppm by weight for configuration 1 and 1489 ppm by weight for configuration 2, which illustrates the greater accumulation of HPNAs in configuration 1 due to the non-optimized purge of the HPNAs in the recycling loop and the absence of the separation column 20 upstream of the fractionation section 32 in accordance with the invention. Thus, in the process in accordance with the invention, over time, a significant reduction in the quantity of HPNA in the process, and thus in the reaction section 2, is observed.

In addition, compared with the prior art configuration of FIG. 1, configuration 2 of the invention can be used in order to minimize the quantity of HPNA sent to the fractionation section 32 and thus the quantity of HPNA which returns to the reaction section via the conduit 18. Because of this, the accumulation of HPNA in the recycling loop is reduced at all points of this loop:

stream 9a: 1489 ppm by weight in configuration 2 of the invention compared with 2053 ppm by weight in the prior art configuration 1, i.e. a reduction of 27.5% stream 18: 1105 ppm by weight in configuration 2 of the invention, compared with 1526 ppm by weight in the prior art configuration 1, i.e. a reduction of 27.6%.

Finally, the reduction in the accumulation of HPNA in the recycling loop means that the deactivation due to HPNA of the catalysts used in the process can be limited, and thus their cycle time and service life can be increased. Assuming a cycle time for the catalysts for the prior art configuration 1 of 100, the reduction in the accumulation of HPNAs in the recycling loop means that the cycle time for the catalysts used in the process in accordance with the invention can be improved to a value in the range 110 to 130 in configuration 2 of the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for hydrocracking a feed, said feed comprising 20% to 100% by volume of compounds having a boiling temperature of more than 340° C., a sulphur content in the range 0.01% to 5% by weight, a nitrogen content of more than 500 ppm by weight, a cumulative nickel and vanadium content of less than 2 ppm by weight and an asphaltenes content of less than 3000 ppm by weight, said process consisting of:
   a) hydrocracking said feed, at a temperature of more than 200° C., a pressure of more than 1 MPa, a space velocity in the range 0.1 to 20 h$^{-1}$ and a volume ratio, in litre of hydrogen/litre of feed, in the range 80 to 5000, obtaining a hydrocracked effluent,
   b) separating the effluent obtained from hydrocracking in a) carried out in a hot separation zone comprising a high pressure hot separator, said pressure being more than 0.5 MPa and less than the pressure employed in hydrocracking in a), and the temperature being in the range 200° C. to 450° C., and optionally a medium pressure hot separator at a pressure below 4.5 MPa and at a temperature in the range 200° C. to 450° C., obtaining a gaseous effluent from the head of the high pressure hot separator and a heavy effluent from the bottom of the high pressure hot separator,
   c) sending the gaseous effluent obtained from b) at the head of the high pressure hot separator directly to a cold separation zone comprising a high pressure cold separator at a temperature in the range 0° C. to 200° C., and at a pressure of more than 0.5 MPa and less than the pressure employed in b), and obtaining a gaseous effluent from the head of the high pressure cold separator and a heavy effluent from the bottom of the high pressure cold separator,
   d) separating the heavy effluent obtained from b), carried out in a separation column that is a stripper or a reboiler column, obtaining a gaseous effluent from the head of said column and a residue from the bottom of the column, and at least a portion of said residue, concentrated in HPNA, is eliminated by purge,
   e) fractionating the heavy effluent obtained from c) and of the gaseous effluent obtained in d) in a fractionation section, and obtaining at least one naphtha fraction, at least one gas oil fraction, and a residue and recycling said residue, in part or in its entirety, to hydrocracking in a).

2. The process as claimed in claim 1, in which the feed to a) is a hydrorefined feed.

3. The process as claimed in claim 1, wherein in b) the heavy effluent obtained from the high pressure hot separator is treated in the medium pressure hot separator at a pressure below 4.5 MPa and at a temperature in the range 200° C. to 450° C., and a gaseous effluent and a heavy effluent are obtained, said heavy effluent being sent to d).

4. The process as claimed in claim 1, in which the high pressure cold separator is a flash drum, a stripper or a simple distillation column, and at a pressure which is lower than the pressure of b) by 0.1 MPa to 1.0 MPa.

5. The process as claimed in claim 3, separating in the cold separation zone the heavy effluent at a pressure of less than 4.5 MPa and at a temperature in the range 0° C. to 200° C., obtaining a gaseous effluent and a heavy effluent which are sent to step e).

6. The process as claimed in claim 1, in which the separation d) is carried out by stripping using a gas that is hydrogen or steam at a pressure in the range 0.1 MPa to 2.0 MPa.

7. The process as claimed in claim 1, in which the fractionation section employed in e) comprises one or more distillation columns in which the pressure is in the range 0.01 MPa to 0.5 MPa.

* * * * *